(12) United States Patent
Yoon et al.

(10) Patent No.: US 6,519,058 B1
(45) Date of Patent: Feb. 11, 2003

(54) MULTIWAVE OPTICAL BUFFER USING LOOP MIRROR

(75) Inventors: Kyeong Mo Yoon, Taejeon (KR); Sang Goo Lee, Taejeon (KR); Jin Sik Park, Seoul (KR)

(73) Assignee: Korea Telecommunication Authorithy, Kyunggi-do (KR)

( * ) Notice: Subject to any disclaimer, the term of this patent is extended or adjusted under 35 U.S.C. 154(b) by 0 days.

(21) Appl. No.: 09/426,738

(22) Filed: Oct. 26, 1999

(30) Foreign Application Priority Data

Oct. 27, 1998 (KR) .............................. 98-45158

(51) Int. Cl.[7] .................................................. H04J 4/00
(52) U.S. Cl. ...................... 359/123; 359/183; 359/158
(58) Field of Search ................................ 359/115, 123, 359/135, 158, 183

(56) References Cited

U.S. PATENT DOCUMENTS 6,175,433 B1 * 1/2001 Patel et al. .................. 359/138

FOREIGN PATENT DOCUMENTS

JP            156878       *  6/2000

OTHER PUBLICATIONS

K.L. Hall, et al.; "All–Optical Buffering of 40–Gb/s Data Packets"; *IEEE Photonics Technology Letters*; Mar. 1998; vol. 10, No. 3, p. 442–444.

* cited by examiner

*Primary Examiner*—Kinfe-Michael Negash
(74) *Attorney, Agent, or Firm*—Merchant & Gould P.C.

(57) ABSTRACT

A multiwave optical buffer using a loop mirror of the present invention can transmit cells to a preferable node in accordance with electric control, without causing conflicts among the cells, when the cells having various waves reach a single node at the same time on a high-speed network. In order to prevent conflicts among the cells, the multiwave optical buffer using the loop mirror in accordance with the present invention stores cells having low priority and outputs the cells in a preferable time pursuant to the electric phase control, thereby improving efficiency of a high-speed optical communication network.

13 Claims, 2 Drawing Sheets v:light proceeding speed in optical fiber

MULTIWAVE OPTICAL BUFFER USING LOOP MIRROR

BACKGROUND OF THE INVENTION

1. Field of the Invention

The present invention relates to a multiwave optical buffer using a loop mirror, and in particular to an improved multiwave optical buffer using a loop mirror which can store cells having low priority, sequentially output the cells in a preferable time, and arrange and output cells which are wave-multiplexed in a wave-multiplexed system and inputted at the same time, on a time axis in accordance with an electrical external control signal, in order to prevent conflicts among the cells to be outputted to an identical channel on a high-speed time division multiplexing local network or backbone.

2. Description of the Background Art

Recently, a demand of the users for high quality service has been sharply increased, thus requiring a high-speed network. However, it is difficult to prevent conflicts among cells in accordance with an electrical method by a photoelectric conversion on a predetermined switching node. In addition, an optical buffering method by electric control has been suggested (K. L. Hall, Member, IEEE, and K. A. Rauschenbach, Member, IEEE, "All-Optical Buffering of 40-Gb/s Data Packets", IEEE Photonics Technology Letters. Vol. 10, No. 3, March 1998).

According to the optical buffering method, when input cells are stored, 90% of the cells are duplicated and discarded, 10% of the cells are inputted to a loop and reproduced to 100%, 90% of the reproduced cells are discarded again, and 10% of the cells are inputted to the loop and reproduced to 100%. There is a disadvantage in that the above-described method additionally requires a structure for processing the discarded cells.

SUMMARY OF THE INVENTION

It is therefore an object of the present invention to provide a multiwave optical buffer using a loop mirror which can transmit cells to a preferable node in accordance with electric control without causing conflicts among the cells, when the cells having various waves reach a single node at the same time on a high-speed network.

In order to achieve the above-described object of the present invention, there is provided a multiwave optical buffer using a loop mirror, including: a loop mirror wave-dividing and storing cells inputted from an input terminal at an initial stage, and reflecting the cells in an input direction; a cell input unit controlling a gain and optical power of the cells reflected by the loop mirror, and re-inputting the cells into the loop mirror; and a controller controlling an external output according to waves in regard to the cells inputted and stored in the loop mirror.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

A multiwave optical buffer using a loop mirror in accordance with a preferred embodiment of the present invention will now be described in detail with reference to the accompanying drawings.

Figure 1:
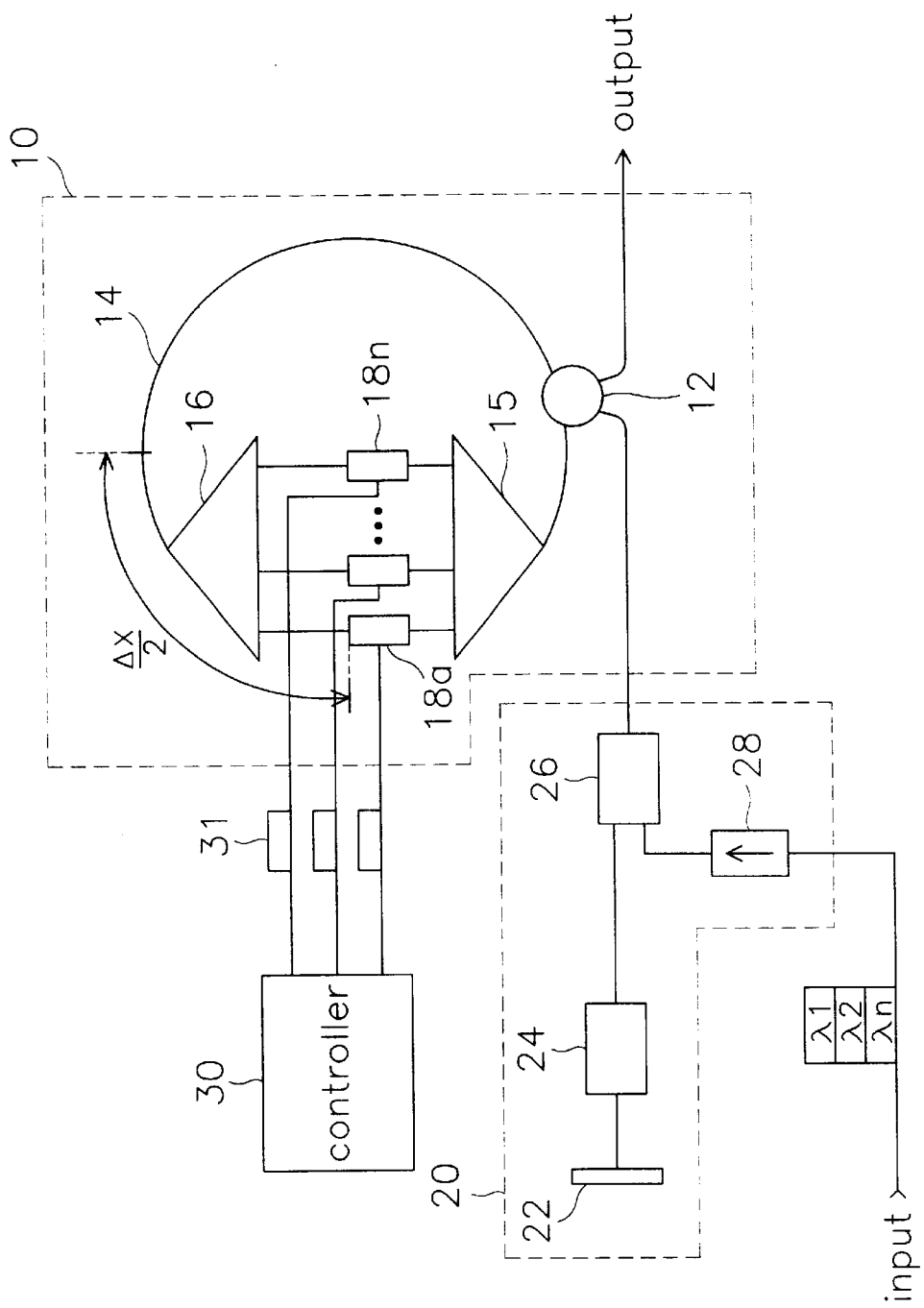
FIG. 1 is a structure diagram illustrating a multiwave optical buffer using a loop mirror in accordance with a preferable embodiment of the present invention.

FIG. 1 is a structure diagram illustrating the multiwave optical buffer using the loop mirror in accordance with the preferred embodiment of the present invention. As shown therein, the multiwave optical buffer using the loop mirror includes: a loop mirror 10 wave-dividing and storing input cells, and reflecting the cells in an input direction; a cell input unit 20 inputting the initially-inputted cells from the input terminal to the loop mirror 10, controlling a gain and optical power of the cells reflected by the loop mirror 10, and re-inputting the cells into the loop mirror 10; and a controller 30 controlling an external output according to waves in regard to the cells inputted and stored in the loop mirror 10.

The loop mirror 10 includes: a first optical coupler 12 (2×2 optical coupler) branching the input cells ($\lambda 1$, $\lambda 2$, $\lambda n$) at a predetermined ratio (for example, 50:50); a single mode fiber 14 which is a path through which the cells branched and inputted from the first optical coupler 12 are moved in the clockwise and counterclockwise directions; first and second Mux/Demuxes 15, 16 provided between the single mode fiber 14 in an inverse shape, interactively transmitting and receiving the cells moved through the single mode fiber 14, and performing multiplexing and inverse-multiplexing operations; and a plurality of phase modulators 18a~18n connected between the first and second Mux/Demuxes 15, 16, and carrying out a phase modulation on the cells.

The cell input unit 20 includes: a mirror 22 coated or adhered to an end portion of an optical fiber, and re-reflecting the cells reflected from the loop mirror 10 to the loop mirror 10; a semiconductor optical amplifier 24 provided between the loop mirror 10 and the mirror 22, controlling a gain of the cells reflected from the loop mirror 10, transmitting the cells to the mirror 22, and transmitting the cells re-reflected from the mirror 22 to the loop mirror 10; a second optical coupler 26 (2×1 optical coupler) provided between the semiconductor optical amplifier 24 and the loop mirror 10, coupling the cells from the semiconductor optical amplifier 24 to the cells from the input terminal, and transmitting the coupled cells to the loop mirror 10; and an isolator 28 disposed between the input terminal and one input terminal of the second optical coupler 26, and removing the cells duplicated through the second optical coupler 26 and returning to the input terminal, while the cells are stored in the loop mirror 10.

The controller 30 applies an electrical pulse corresponding to a length of the input cells to the phase modulators 18a~18n in the loop mirror 10, in order to output the input cells in a preferable time.

The operation of the multiwave optical buffer using the loop mirror in accordance with the preferred embodiment of the present invention will now be explained.

Since a traffic may be increased in a predetermined node, and thus a conflict may be generated among the cells, the cell input unit 20 receives the cells ($\lambda 1$, $\lambda 2$, $\lambda n$) having low priority through the input terminal. Here, while the cells (λ1, λ2, λn) are stored in the loop mirror 10, the isolator 28 in the cell input unit 20 receiving the cells (λ1, λ2, λn) removes the cells which are duplicated and return through the second optical coupler 26. The cells inputted via the second optical coupler 26 are inputted to the first optical coupler 12 of the loop mirror 10. The first optical coupler 12 branches the inputted cells (λ1, λ2, λn) at a ratio of 50:50. The branched input cells are divided into the cells proceeding in the clockwise and counterclockwise directions through the loop consisting of the single mode fiber 14, the first and second Mux/Demuxes 15, 16 and the phase modulators 18a~18n. When the cells pass through the loop, if a voltage is not applied to the phase modulators 18a~18n, the cells proceeding in both directions are multiplexed and inverse-multiplexed, respectively. When the cells pass through the phase modulators 18a~18n, deflection rates thereof are identically varied. As a phase variation is in proportion to a deflection variation, the cells proceeding in both directions have the identical phase, regardless of an order of reaching to the phase modulators 18a~18n. As a result, when the cells circulate in the loop once, the phases thereof are matched, and thus the cells are outputted (reflected) in an input direction of the loop mirror 10.

The cells reflected as described above and inputted to the cell input unit 20 pass through the second optical coupler 26, and obtain the gain from the semiconductor optical amplifier 24. That is, the cells obtain the gain as much as power of the cells (λ1, λ2, λn) firstly inputted to the second optical coupler 26. Thereafter, the input cells obtaining the gain are all reflected by the mirror 22 coated or adhered to the end portion of the optical fiber, and re-inputted to the second optical coupler 26 through the semiconductor optical amplifier 24. Here, an optical power of the input cells which are multiplexed and inputted to the second optical coupler 26 is identical to the optical power of the cells (λ1, λ2, λn) which are firstly inputted to the second optical coupler 26. The reflected/amplified cells are re-inputted to the loop consisting of the single mode fiber 14, the first and second Mux/Demuxes 15, 16 and the phase modulators 18a~18n through the second optical coupler 26 and the first optical coupler 12. So long as the state of the phase modulators 18a~18n is not varied, as described above, the cells which are re-inputted to the loop circulate in the loop once, are outputted in the input direction, and reflected/amplified, repeatedly.

Accordingly, so long as the electrical pulse 31 is not inputted from the controller 30, the input cells are permanently stored. In order to output the input cells in a preferable time, the electrical pulse 31 corresponding to a length of the input cells is applied to the phase modulators 18a~18n.

For the detailed description of the present invention, as shown in FIG. 1, the first and second Mux/Demuxes 15, 16 and the phase modulators 18a~18n are positioned at the left side from the center of the loop mirror 10, and thus the cells proceeding in the clockwise direction firstly pass through the phase modulators 18a~18n. The electrical pulse 31 applied from the controller 30 for output must be sufficiently great to vary the phase of the optical signal passing through the phase modulators 18a~18n as much as π.

Figure 2:
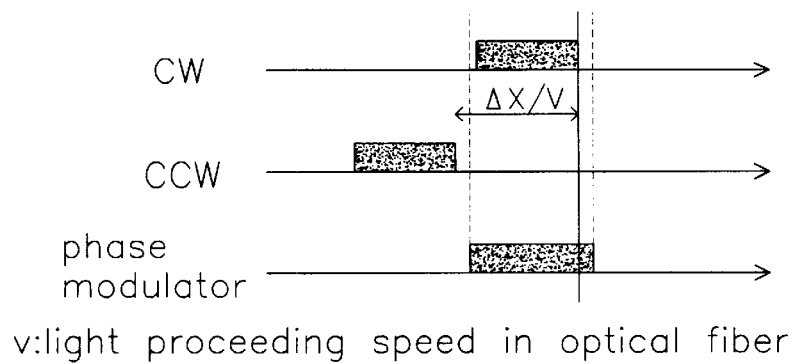
FIG. 2 is a timing diagram of phase modulators as shown in FIG. 1.

As illustrated in FIG. 2, the phase modulators 18a~18n are in an OFF state before the cells are inputted to the loop mirror 10, and are in an ON state while the cells branched in the clockwise CW direction through the first optical coupler 12 and firstly reaching the phase modulators 18a~18n pass through the phase modulators 18a~18n. In addition, ΔX (switching window) is sufficiently long to delay a reaching time to the phase modulators 18a~18n of the input cells proceeding in the counterclockwise CCW direction, until the—input cells proceeding in the clockwise CW direction all pass through the phase modulators 18a~18n, and the phase modulators 18a~18n become the OFF state pursuant to the electrical control pulse. For instance, when 53 bytes of the ATM cell are modulated to 10 Gbps, a length of an ATM cell is 42.4 ns(424 bit×100 ps), and ΔX (switching window) including a guard time is greater than 42.4 ns. When the cells proceeding in the clockwise CW direction completely pass through the phase modulators 18a~18n in the ON state, just before the cells proceeding in the counterclockwise CCW direction reach the phase modulators 18a~18n, if the state of the phase modulators 18a~18n is varied to the OFF state in accordance with the electrical signal, the phase of the cells proceeding in the counterclockwise CCW direction is different from the phase of the cells proceeding in the clockwise CW direction by π.

Figure 3:
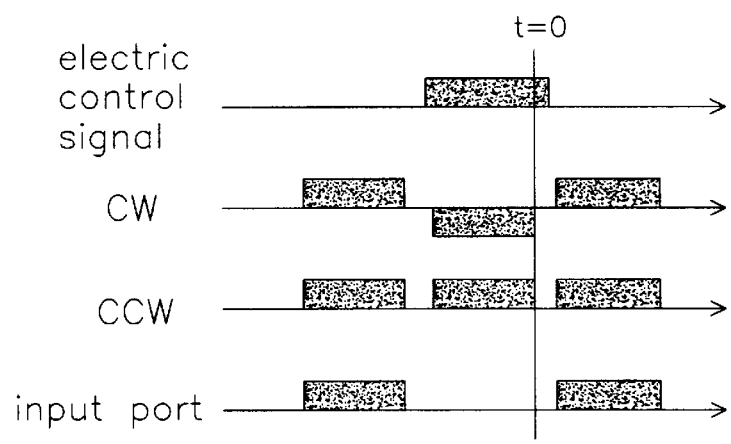
FIG. 3 is a timing diagram of an input port as shown in FIG. 1 when two cells circulate in the loop mirror, reach a first optical coupler, and branch off.
Figure 4:
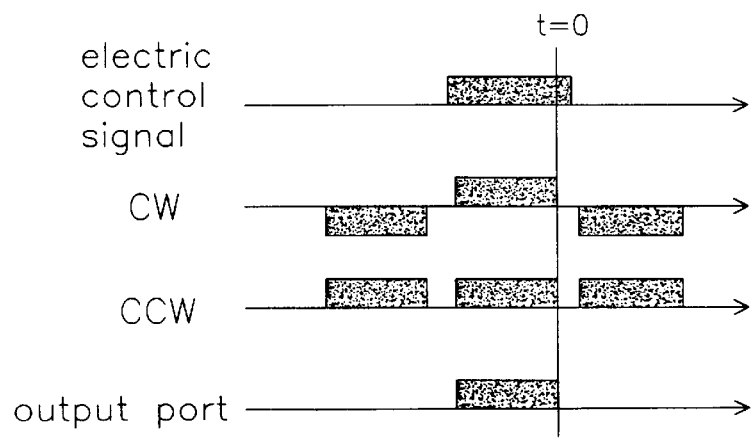
FIG. 4 is a timing diagram of an output port as shown in FIG. 1 when the two cells circulate in the loop mirror, reach the first optical coupler, and branch off.

FIGS. 3 and 4 are timing diagrams of input and output ports when two cells circulate in the loop, reach the first optical coupler 12 and branch off. In the two cells which circulate in the loop in the opposite directions, experience different phase states according to the electric control signal, have a phase difference as much as π, and reach the first optical coupler 12, the cells branched to the input port by the phase difference thereof are removed by a destructive interference, and the cells branched to the output port are outputted having all energy of the inputted optical signal by a constructive interference.

The operational principle of the loop when the electric control pulse for outputting a specific wave is inputted will now be described. As discussed earlier, the input cells are branched in the first optical coupler 12 at a ratio of 50:50, and proceed in the opposite directions, respectively. Before the input cells proceeding in the clockwise CW direction are inverse-multiplexed in the first Mux/Demux 15, and inputted to the phase modulators 18a~18n, a voltage of Vπ is applied (ON state) to the phase modulator (for instance, 18a) having the highest priority, in order to experience a phase difference as much as π. A voltage is not applied to the other phase modulators 18b~18n, and thus a phase thereof is not varied. Since a length of the cells proceeding in the clockwise CW direction is smaller than ΔX (switching window), until the cell having the highest priority experience the phase difference as much as π, and is outputted from the phase modulator 18a, the input cells proceeding in the counterclockwise CCW direction pass through the fiber corresponding to ΔX. The phase of the cells in the counterclockwise CCW direction passing after the phase modulator 18a becomes the OFF state is not varied. When the respective input cells circulate in the loop once and reach the first optical coupler 12, only the cell applying the voltage to the phase modulators 18a~18n experiences the phase difference as much as π, and is outputted to the opposite port of the loop. The other cells do not have the phase difference as described above, and thus are reflected to the input port. In the same manner, the wave signals can be sequentially outputted in accordance with the electric control signal, starting from the cell having the highest priority.

As discussed earlier, in accordance with the present invention, the cells having low priority are optically stored and selectively outputted pursuant to the electrical control pulse, when the traffic is not busy. Consequently, the conflicts among the cells can be prevented, thereby improving efficiency of the high-speed optical communication network.

As the present invention may be embodied in several forms without departing from the spirit or essential characteristics thereof, it should also be understood that the above-described embodiment is not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A multiwave optical buffer using a loop mirror, comprising:
    a loop mirror for wave-dividing and storing cells inputted from an input terminal at an initial stage, and reflecting the cells in an input direction;
    a cell input unit for controlling a gain and optical power of the cells reflected by the loop mirror, and re-inputting the cells into the loop mirror; and
    a controller for controlling an external output according to waves in regard to the cells inputted and stored in the loop mirror.

2. The multiwave optical buffer according to claim 1, wherein the-loop mirror comprises:
    a first optical coupler for branching the input cells at a predetermined ratio;
    a single mode fiber which is a path through which the branched and inputted cells are moved;
    first and second Mux/Demuxes provided between the single mode fiber in an inverse shape, interactively transmitting and receiving the cells, and performing multiplexing and inverse-multiplexing operations; and
    a plurality of phase modulators connected between the first and second Mux/Demuxes, and carrying out a phase modulation on the cells.

3. The multiwave optical buffer according to claim 2, wherein the first optical coupler branches the input cells at a ratio of 50:50.

4. The multiwave optical buffer according to claim 2, wherein the cell input unit comprises:
    a mirror for re-reflecting the cells reflected from the loop mirror to the loop mirror;
    a semiconductor optical amplifier for controlling a gain of the cells reflected from the loop mirror, transmitting the cells to the mirror, and transmitting the cells re-reflected from the mirror to the loop mirror; and
    a second optical coupler for coupling the cells from the semiconductor optical amplifier to the cells from the input terminal, and transmitting the coupled cells to the loop mirror.

5. The multiwave optical buffer according to claim 4, wherein the mirror is coated at an end portion of an optical fiber.

6. The multiwave optical buffer according to claim 4, wherein the mirror is adhered to an end portion of an optical fiber.

7. The multiwave optical buffer according to claim 4, wherein the an optical power of the cells which are outputted from the semiconductor optical amplifier and inputted to the second optical coupler is identical to an optical power of the cells which are firstly inputted to the loop mirror.

8. The multiwave optical buffer according to claim 2, wherein the cell input unit comprises:
    a mirror for re-reflecting the cells reflected from the loop mirror to the loop mirror;
    a semiconductor optical amplifier for controlling a gain of the cells reflected from the loop mirror, transmitting the cells to the mirror, and transmitting the cells re-reflected from the mirror to the loop mirror; and
    a second optical coupler for coupling the cells from the semiconductor optical amplifier to the cells from the input terminal, and transmitting the coupled cells to the loop mirror; and
    an isolator for removing the cells duplicated through the second optical coupler and returning to the input terminal, while the cells are stored.

9. The multiwave optical buffer according to claim 8, wherein the mirror is coated at an end portion of an optical fiber.

10. The multiwave optical buffer according to claim 8, wherein the mirror is adhered to an end portion of an optical fiber.

11. The multiwave optical buffer according to claim 8, wherein an optical power of the cells which are outputted from the semiconductor optical amplifier and inputted to the second optical coupler is identical to an optical power of the cells which are firstly inputted to the loop mirror.

12. The multiwave optical buffer according to claim 2, wherein the controller applies an electrical pulse corresponding to a length of the cells inputted to the phase modulators, and outputs the input cells in accordance with priority.

13. The multiwave optical buffer according to claim 12, wherein the input cells are outputted when the electrical pulse varies a phase of the optical signal passing through the phase modulators by a predetermined amount.

* * * * *